United States Patent
Afram et al.

(10) Patent No.: US 9,934,124 B2
(45) Date of Patent: Apr. 3, 2018

(54) IMPLEMENTATION OF PROCESSOR TRACE IN A PROCESSOR THAT SUPPORTS BINARY TRANSLATION

(71) Applicant: Intel Corporation, Santa Clara, CA (US)

(72) Inventors: Furat F. Afram, Portland, OR (US); Jeffrey J. Cook, Portland, OR (US); Paul Caprioli, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 357 days.

(21) Appl. No.: 14/732,028

(22) Filed: Jun. 5, 2015

(65) Prior Publication Data

US 2016/0357658 A1 Dec. 8, 2016

(51) Int. Cl.
*G06F 11/36* (2006.01)

(52) U.S. Cl.
CPC ...... *G06F 11/3624* (2013.01); *G06F 11/3636* (2013.01)

(58) Field of Classification Search
CPC .......................... G06F 11/3636; G06F 11/3624
USPC .......................................................... 717/128
See application file for complete search history.

(56) References Cited

U.S. PATENT DOCUMENTS

| | | | | |
|---|---|---|---|---|
| 6,295,644 B1* | 9/2001 | Hsu | ................... | G06F 8/443 711/125 |
| 7,213,126 B1* | 5/2007 | Smaus | ................... | G06F 9/3806 365/230.01 |
| 8,583,967 B2 | 11/2013 | Walker | | |
| 8,683,243 B2 | 3/2014 | Wu | | |
| 8,826,257 B2 | 9/2014 | Al-Otoom | | |
| 2003/0005271 A1* | 1/2003 | Hsu | ................. | G06F 9/3802 712/237 |
| 2004/0064685 A1* | 4/2004 | Nguyen | ................ | G06F 11/348 712/227 |
| 2012/0272011 A1* | 10/2012 | Carrie | ................ | G06F 11/3466 711/146 |
| 2013/0145350 A1* | 6/2013 | Marinescu | ........ | G06F 17/30563 717/128 |
| 2014/0189314 A1 | 7/2014 | Kurts | | |

(Continued)

OTHER PUBLICATIONS

U.S. Appl. No. 14/614,264, filed Feb. 4, 2015, entitled "Apparatus and Method for Architectural Performance Monitoring in Binary Translation Systems," by Jason M. Agron.

(Continued)

*Primary Examiner* — John Chavis
(74) *Attorney, Agent, or Firm* — Trop, Pruner & Hu, P.C.

(57) ABSTRACT

In an embodiment, a processor includes execution logic to execute binary translated (BT) code that is translated from native architecture (NA) code. The processor also includes processor trace (PT) logic to output trace information responsive to execution of a BT direct branch instruction in the BT code when the NA code includes an NA direct branch instruction that corresponds to the BT direct branch instruction. The trace information is to include an indication of an NA outcome associated with an execution of the NA direct branch instruction. The trace information is to be based on a BT outcome associated with the execution of the BT direct branch instruction. Other embodiments are described and claimed.

20 Claims, 8 Drawing Sheets

(56) References Cited

U.S. PATENT DOCUMENTS

2015/0347220 A1* 12/2015 Hermany ............ G06F 11/0742
714/48
2017/0046196 A1* 2/2017 Muttik .................... G06F 21/56

OTHER PUBLICATIONS

Intel Corporation, "IA-32 Intel® Architecture Software Developer's Manual vol. 3: System Programming Guide", Basic Architecture, Order No. 245470-012; Instruction Set Reference Manual, Order No. 245471-012; and the System Programming Guide, Order No. 245472-012, 2003, pp. 1-798.

* cited by examiner

IMPLEMENTATION OF PROCESSOR TRACE IN A PROCESSOR THAT SUPPORTS BINARY TRANSLATION

TECHNICAL FIELD

Embodiments pertain to software diagnostic techniques in an environment that supports binary translation.

BACKGROUND

Binary translation may be utilized to translate a code to a binary translated code. A processor may be configured to execute software in more than one instruction set architecture. One instruction set may be more efficiently processed by the processor than another instruction set. In order to take advantage of characteristics of the processor, software compiled into a first code (e.g., native architecture code) may be translated to a second code (e.g., binary translated code), and the binary translated code may be executed by the processor instead of the native architecture code. For example, software compiled into native architecture (NA) code may be translated to binary translated (BT) code for execution by the processor in order to take advantage of inherent characteristics of the processor associated with execution of the BT code, e.g., execution speed, reduced energy consumption, or other properties.

In software development, access to a history of execution of code, e.g., information that pertains to critical points, such as instruction branch points, can be helpful to debug the code, or to "tune" the code in order to achieve greater efficiency. The history ("trace") may be created by the processor as the code is being processed. The trace can provide a record of events that have occurred during execution of the code.

DETAILED DESCRIPTION

Figure 1:
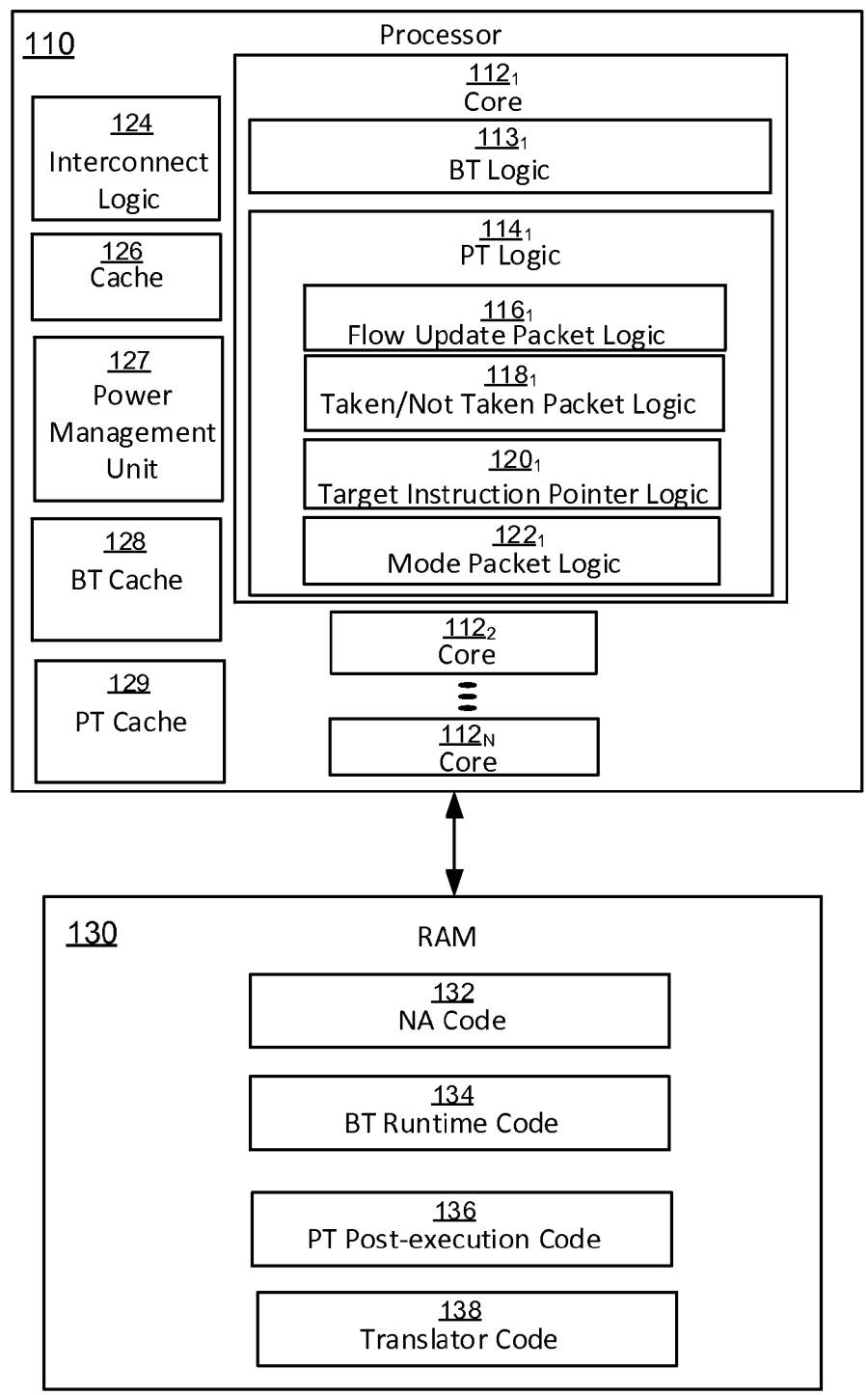
FIG. 1 is a block diagram of a system, according to embodiments of the present invention.

Processor trace (PT) includes diagnostic data, e.g., a plurality of PT packets that may be generated while a program is being executed. PT can be useful to debug the program or to tune the program (e.g., make adjustments to the code in order to improve efficiency, reduce power consumption, or to change other execution characteristics). When a processor executes BT code (e.g., BT code has been translated from NA code or the BT code is associated with NA code), the processor (e.g., dedicated hardware within the processor) may generate PT that represents a history of the BT code. For example, the PT may include an indication of a branch taken of a branch instruction executed within the BT code.

However, a programmer typically analyzes the NA code rather than the BT code. Hence, diagnostic information that pertains to the BT code is typically of little interest to a user who intends to debug the NA code. In fact, the user who intends to execute native architecture (NA) code (e.g., Intel ® x86 code, or another native code) may be unaware of translation of the NA code to BT code and execution of the BT code by the processor.

Embodiments may modify the PT produced in order to provide information useful to the user (e.g., programmer) who wishes to debug the NA code. According to embodiments of the present invention, software, hardware, and micro-architectural support may be provided to allow binary translation systems to emulate PT services for use in analysis of NA code.

For example, embodiments address 1) target instruction pointer (TIP) packets, each of which is to record a target instruction pointer of an indirect branch; 2) taken not-taken (TNT) packets, each of which is to track a direction of a direct conditional branch; and 3) flow update packets (FUPs), each of which is to provide a source instruction pointer address in NA code for an asynchronous interrupt event received during execution of BT code.

Embodiments may provide new PT records and a mechanism by which BT runtime software (e.g., ancillary software that is to provide various auxiliary functions while the BT executes) generates BT runtime metadata to enable address translation of an instruction pointer from BT code to NA code. Additionally, logic within a processor (e.g., dedicated hardware, firmware, or software) may output "raw" TIP packets that, together with the BT runtime metadata, can be converted to TIP packets associated with NA code. A post-processing phase may be implemented in which post-processing software is to create a converted PT that pertains to NA code, the converted PT determined from a raw PT that is associated with BT code.

It is typically desirable to minimize any performance perturbation to the BT code being traced. Hence, some trace data that pertains to BT may be omitted and metadata may be added so that a post-processing methodology can reconstruct the corresponding NA control flow. A BTM instruction ('EMIT_BTM') may be included in the BT code that enables the BT runtime software to output a binary translation metadata (BTM) packet into the PT. Other BT instructions may be used to assemble data for the BTM packet into registers and/or memory (e.g., dynamic random access memory (DRAM)). The BTM instruction "EMIT_BTM" may cause the BTM packet to be queued for output. Each BTM packet may provide a mapping from a translation descriptor and offset in a BT translation code cache, to an instruction pointer in NA code.

When a processor is running with BT activated but PT disabled, when the PT is subsequently enabled, logic (e.g., hardware) within the processor may generate a "trap" (e.g., interrupt) into the BT runtime software. The BT runtime software then emits BTM packets for all existing translations that are valid. Note that the BT runtime software may choose to invalidate some or all existing translations rather than to emit BTM packets for the existing translations. Alternatively, hardware may cause all BT translations to be marked as invalid rather than to generate a trap to the BT runtime software.

If the BT runtime software is invoked to create new translations or to validate existing (invalid) translations while PT is enabled, the BT runtime software may also emit BTM packets for these new (and/or validated existing) translations. Note that relocation of a translation within a translation cache (e.g. a side-effect of garbage collection) is considered to be the same operation as validation of an existing translation, and corresponding BTM packets are to be generated by the BT runtime software.

Alternatively, the BT runtime software can create an internal log of any modifications that the BT runtime software makes to the translations. BTM packets can be triggered by an interrupt, e.g. when a PT output buffer fills or when PT is disabled.

In order for hardware to indicate whether the processor is executing NA code or is executing BT code, MODE packets may be augmented. MODE packets are used to provide a PT decoder with processor execution information so that the PT decoder can properly interpret the BT code and a PT log. In embodiments, a bit pattern in the MODE packet can be used to indicate BT execution.

When executing BT code, the NA TIP payload can be replaced with a BT code data payload <HERE, OFFSET, RIP>, where:
  HERE=value of the "here" register, a translation descriptor retrieval mechanism
  OFFSET=instruction pointer in the translation code cache, i.e. (BT IP-HERE)
  RIP=Emulated relative instruction-pointer (RIP) register (e.g., X86_RIP)

The BT TIP payload provides enough info to reconstruct or recover NA TIP data when it is combined with BT metadata (BTM). The RIP register typically stores a virtual address. In general, more than one NA virtual address may map to the same physical address. Thus, BTM packets, which map <HERE, OFFSET> to page offsets in original NA code, when combined with the virtual RIP address, can provide a complete NA code virtual address.

A PT post-processing technique (e.g., implemented in software) can convert the BT TIP packets to the NA TIP packets. The post-processing technique may accomplish the conversion through use of the metadata recorded in the BTM packets. A post-processor is to maintain an internal data structure that includes all of the mappings it has seen from reading BTM packets. The BTM packets can then be discarded and do not need to be included in the output PT.

To simplify a hardware implementation, it may be beneficial to architect the PT post-execution procedure to look ahead in the PT if it encounters a BT TIP packet for which it has not already seen the necessary BTM mapping. That is, after all BTM packets have been produced, the PT post-execution procedure may peruse all generated BTM packets to find needed address translation information. Then hardware can separately queue the output of hardware-generated PT packets with software-generated BTM packets.

The above-described software post-processing technique may be treated as a stand-alone PT processing package, but can also be combined with other PT software. Alternatively, software post-processing can be provided in a variety of implementations, including implementation in hardware, firmware, microcode, etc., e.g., as stand-alone software, a stand-alone physical device, or as part of system on a chip (SoC). Optionally, encryption technology can be applied to some or all of the raw PT packets and decryption can occur as part of the PT post-processing technique employed.

FIG. 1 is a block diagram of a system, according to embodiments of the present invention. System 100 includes a processor 110 and a memory 130 (e.g., dynamic random access memory or another memory) coupled to the processor 110. The processor 110 may include one or more cores $112_1$-$112_N$, interconnect logic 124, cache memory 126, a power management unit 127, binary translation (BT) cache 128, processor trace (PT) cache 129, and may include additional components, e.g., logics, memories, control circuitry, etc. (not shown). Core $112_1$ may include BT logic $113_1$ to translate native architecture code to BT code and to store the BT code in the BT cache 128, and may include PT logic $114_1$ to generate PT packets. The memory 130 is to store code that may include native architecture (NA) code 132, BT runtime code 134, PT post-execution code 136, translator code 138, and may include other code to be stored and that may be available to be loaded into the processor 110 for execution by the processor 110.

In operation, the processor 110 may receive NA code 132 from the memory 130 for execution by the processor 110. The processor 110 may translate (e.g., through execution of the translator code 138 by the BT logic $113_1$) the NA code 132 to BT code (not shown), e.g., in order to take advantage of inherent properties of the processor 110 such as greater processing efficiency in BT code, reduced energy consumption, or for other reasons typically associated with execution efficiency. After translation, the BT code may be stored in the BT cache 128, to be executed immediately or at a later time.

The processor 110 may execute the BT code instead of execution of the NA code 132. As the BT code is being executed, processor trace (PT) logic $114_1$ may create a PT history of program execution, e.g., a record of interrupt jumps, direct branches, indirect branches, etc. which, (after conversion to NA PT) can be valuable in analysis of the NA code. The PT history may be formulated as a plurality of PT packets, e.g., to be stored in PT cache 129.

The processor trace logic $114_1$ (e.g., hardware, software, firmware, or a combination thereof) may include one or more logics including, but not limited to, flow update packet logic $116_1$, taken/not taken packet logic $118_1$, target instruction pointer logic $120_1$, and mode packet logic $122_1$. As each PT packet is output, at least one of the logics of the PT update logic $114_1$ may be invoked to modify the PT packet from a description of an event in BT code to a description of an equivalent event in NA code.

For example, a flow update packet (FUP) can provide an instruction pointer (IP) of an instruction in BT code to be executed when an asynchronous interrupt is received by the processor 110. The flow update packet logic $116_1$ may modify the FUP to include a corresponding IP in the NA code, based on a translation of the IP of the BT code to a corresponding IP of the NA code provided by BT runtime code 134 that is executed by the processor 110. The flow update packet logic $116_1$ may maintain a pending status of the asynchronous interrupt, e.g., halt handling of the asynchronous interrupt until the corresponding IP in the NA code is determined. After the asynchronous interrupt is handled, execution of a portion of the NA code (e.g., beginning at the corresponding IP) continues instead of continued execution of the BT code. When the IP of the NA code is determined, the FUP is to be updated to include the IP of the NA code. The updated FUP may be included in the PT and may be stored in the PT cache 128.

In the case of a Taken/Not Taken (TNT) PT packet associated with a direct branch instruction, one TNT PT packet can represent a plurality of direct branches taken. In embodiments, each BT direct branch instruction may include an indicator of a translation case that relates a taken branch of the BT direct branch instruction to a taken branch of a corresponding NA direct branch instruction. TNT Packet Logic 118₁ may evaluate each direct branch instruction encountered in the BT code and the TNT packet logic 118₁ may determine which of the following cases applies: 1) the taken branch in the NA direct branch instruction is of a same polarity (e.g., same direction) as the taken branch of the BT direct branch instruction; 2) the taken branch in the NA direct branch instruction has a polarity reversed from that of the corresponding taken branch of the BT direct branch instruction (e.g., the taken branch is opposite to the taken branch in the corresponding NA branch); 3) the BT direct branch instruction has no corresponding direct branch instruction present in the NA code; 4) a direct branch instruction in NA code has no equivalent direct branch instruction in the BT code. The TNT Packet Logic 118 may modify the TNT PT packet (also TNT packet herein) that represents an outcome of a branch instruction in BT code, to reflect an outcome of the corresponding branch instruction in the NA code.

For the case of an indirect branch instruction in BT code, a target instruction pointer (TIP) is to be generated based on an outcome of the indirect branch instruction. For example, when the target instruction pointer logic 120 detects an indirect branch instruction in BT code, the TIP logic 120 initially is to include, in a "raw" PT packet, a BT target address of a target of the BT indirect branch instruction. The raw PT may be included in the PT history, or the raw PT may be replaced by a modified PT. In embodiments, the BT runtime code 134 is to include a special instruction ("emit_BTM") that upon execution is to cause a binary translation metadata (BTM) packet to be output. The BTM packet is to include a mapping of the BT target address to an NA target address. The BTM packet enables modification of the raw processor trace packet to include the corresponding indirect branch target address in NA code, which may be useful in analysis of the NA code (e.g., debugging, refinement, etc.).

The Mode Packet Logic 122₁ is to formulate PT packets that include an indicator of whether the code being executed is NA code or BT code.

Each PT packet may be stored in the PT cache 128 for post processing analysis that can include execution of the PT post-execution code 138 to modify the TIP packet to reflect the target address in NA code that corresponds to the target address of the corresponding indirect branch instruction executed in BT code.

Figure 2:
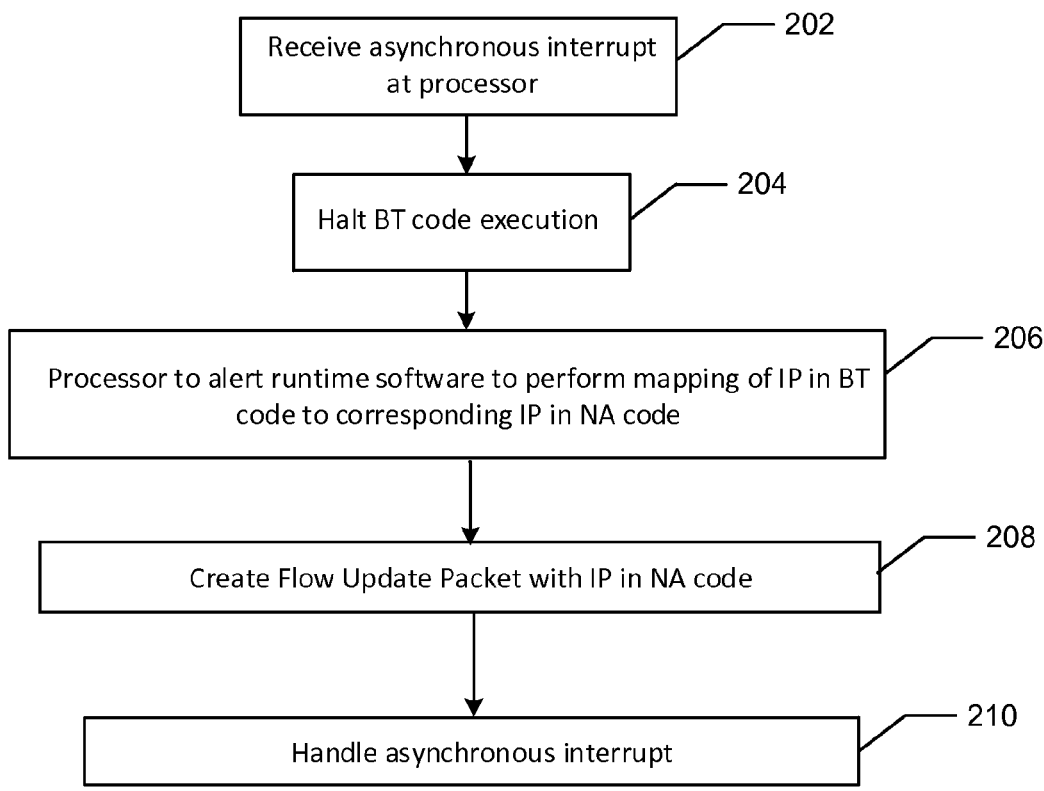
FIG. 2 is a flow diagram of a method, according to embodiments of the present invention.

FIG. 2 is a flow diagram of a method, according to embodiments of the present invention. At block 202, an asynchronous interrupt is received at a processor that is executing BT code, the BT code translated from NA code. Continuing to block 204, responsive to receipt of the asynchronous interrupt, execution of the BT code is halted at the processor, e.g., upon completion of execution of a particular BT instruction. Advancing to block 206, the processor is to alert runtime code ("runtime") to perform a mapping of a BT instruction pointer (IP) that points to an instruction to be executed in BT code, to a corresponding IP in the NA code.

Proceeding to block 208, processor trace logic of the processor is to create a flow update packet that includes the IP (in NA code) at which execution is to proceed in the NA code. Continuing to block 210, the processor is to handle the asynchronous interrupt.

Figure 3:
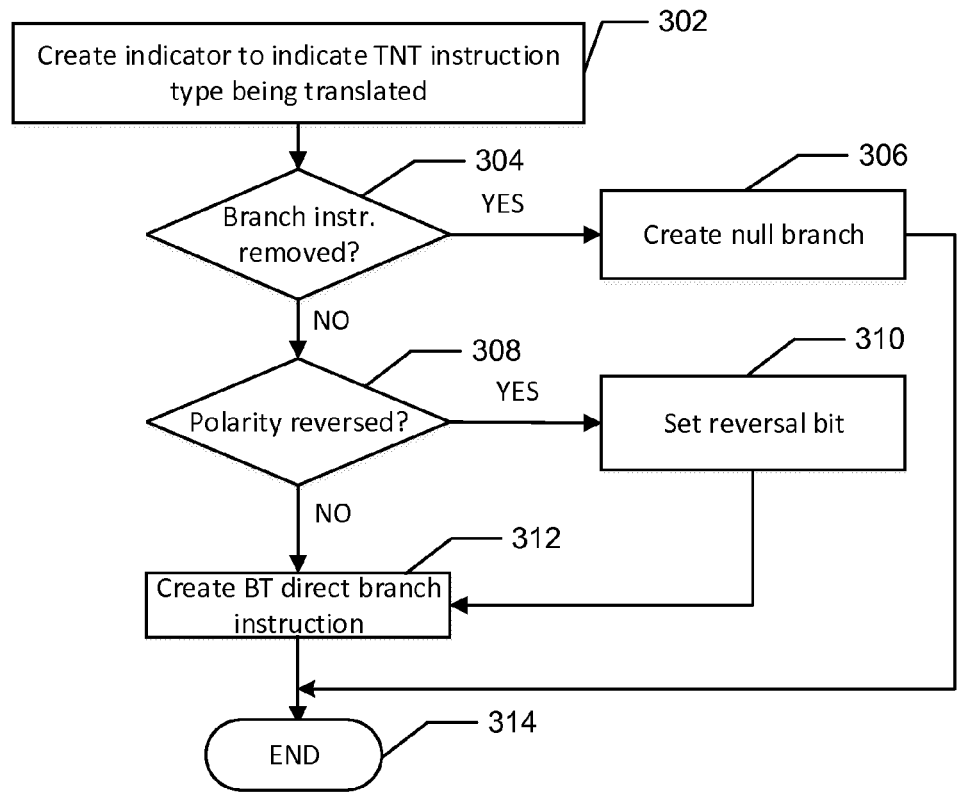
FIG. 3 is a flow diagram of another method, according to embodiments of the present invention.

FIG. 3 is a flow diagram of another method, according to embodiments of the present invention. Method 300 is to create BT direct branch instructions (e.g., by binary translation logic, e.g., BT logic 113₁ of FIG. 1, which may execute translator code 138), and for each BT direct branch instruction, an indicator of a relationship between an outcome in NA code and an outcome of the corresponding BT direct branch instruction. Beginning at block 302, a code translation program is to determine a relationship between the NA direct branch instruction in NA code and the BT direct branch instruction in BT code (e.g., one of four cases discussed above). A type indicator is to be created to indicate which case applies. For example, in an embodiment the type indicator associated with the BT direct branch instruction is a polarity indicator (e.g., 2-bit) that is to indicate one of the four cases of direct branch instruction: 1) NA direct branch taken corresponds to a branch taken in BT code; 2) BT code branch taken has a reversed polarity (e.g., takes opposite direction) from NA code branch taken; 3) BT direct branch instruction has no corresponding direct branch instruction NA code; and 4) NA direct branch instruction has no corresponding direct branch instruction in BT.

Continuing to decision diamond 304, if the NA direct branch instruction does not exist in the BT code (e.g., branch instruction removed), advancing to block 306 a "null branch" is to be created in the BT code as a place holder that corresponds to the NA branch and the method ends at 314. If, at decision diamond 304, there is a direct branch instruction in BT code that corresponds to the direct branch instruction in NA code (e.g., the branch instruction is not removed in BT code), the method advances to decision diamond 308. At decision diamond 308, if a polarity of the taken branch of the direct branch instruction in the NA code is reversed from the polarity of the taken branch of the direct branch instruction BT code (e.g., branch direction taken in NA code is to be opposite the branch direction taken in BT code) proceeding to block 310 a reversal bit is to be set in the indicator. Continuing to block 312, the processor is to create the BT direct branch instruction in the BT code. The method ends at 314.

If, at decision diamond 308, the polarity of the taken branch in NA code is the same polarity as the taken branch in the BT code, the polarity indicator indicates no polarity reversal. Continuing to block 312 the BT direct branch instruction is created in the BT code, and the method ends at 314.

After execution of each BT direct branch instruction a corresponding TNT PT packet is to be created and is to reflect the instruction pointer in NA code, as determined by the corresponding polarity indicator.

Figure 4:
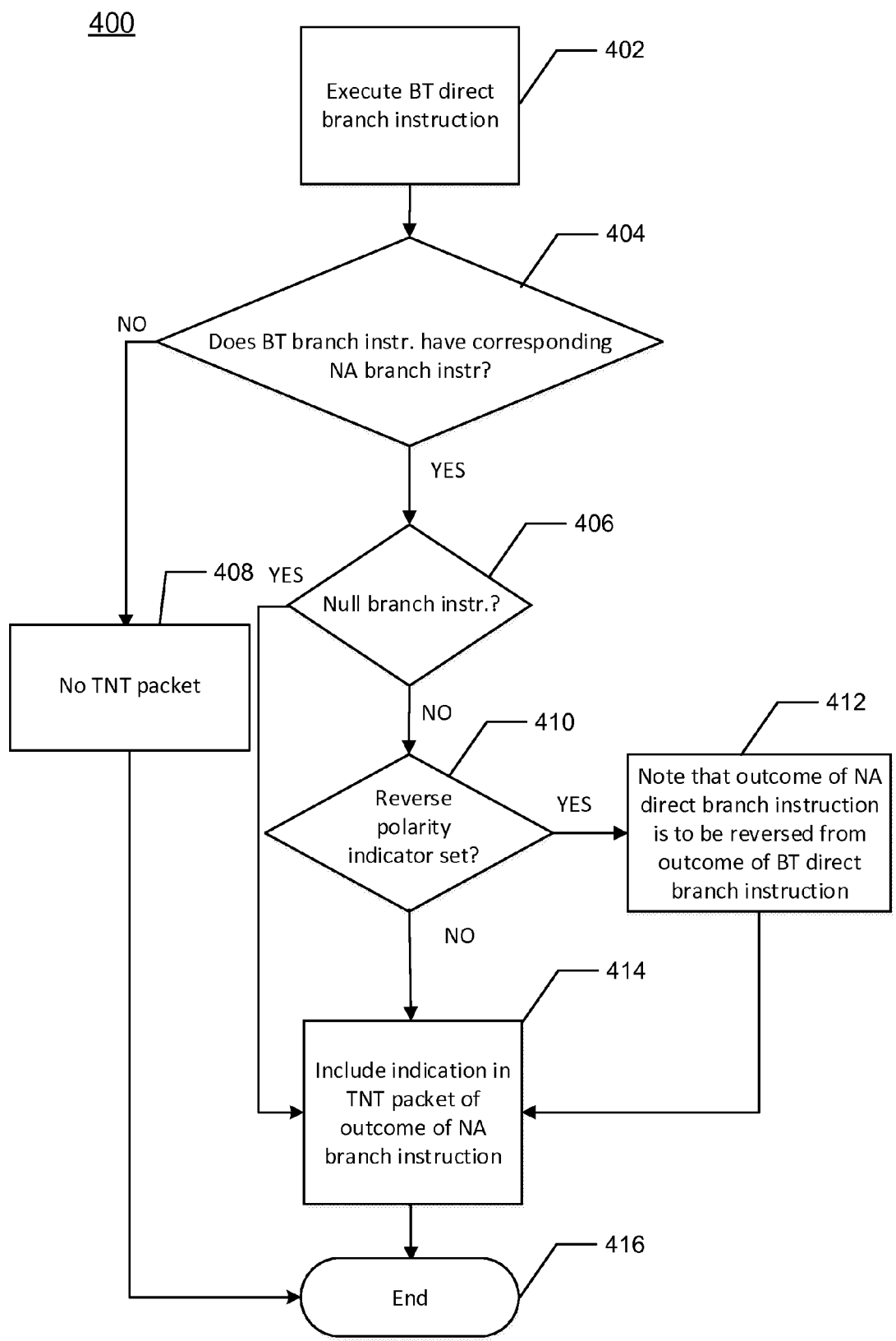
FIG. 4 is a flow diagram of a method, according to an embodiment of the present invention.

FIG. 4 is a flow diagram of a method according to an embodiment of the present invention. Method 400 is to produce a TNT packet based on an executed BT instruction, and is typically to be executed by hardware within a processor. Beginning at block 402, the processor executes a BT direct branch instruction. Continuing to decision diamond 404, if the BT direct branch instruction does not correspond to an NA branch instruction (e.g., translation of NA code to BT code results in a BT direct branch instruction that is included in the BT code without a corresponding NA direct branch instruction) proceeding to block 408 no TNT packet is produced by the PT logic of the processor. That is, since there is no NA direct branch instruction that corresponds to the BT direct branch instruction, no TNT PT packet is produced because there is no NA branch information.

If, at decision diamond 404, the BT direct branch instruction has a corresponding direct branch instruction in the NA code, the method proceeds to decision diamond 406. If, at decision diamond 406, it is determined that the BT direct branch instruction is a null branch instruction (e.g., a place holder that corresponds to an NA direct branch instruction), continuing to block 414 the hardware is to include within a TNT PT packet an indicator is of a branch taken in the corresponding NA branch instruction. That is, the indicator of the branch taken in the NA branch instruction can be determined by the PT logic based on information that has been formulated by translator software and is associated with the null instruction (e.g., internal to the null instruction).

If, at decision diamond 406, the direct branch instruction in the BT code is not a null branch instruction, the method continues to decision diamond 410. At decision diamond 410, if a reverse polarity bit is set in the type indictor, moving to block 412 the TNT polarity indicator is to be reversed to indicate that a taken branch of the direct branch instruction in NA code will be opposite to the taken branch of the direct branch instruction in BT code. Advancing to block 414 an indicator in the TNT PT packet is to indicate that the taken branch in the NA code has opposite polarity to the taken branch of the corresponding direct branch instruction in the (translated) BT code.

If, at decision diamond 410 the polarity indicator is not set, a direct polarity is indicated in the type indicator (e.g., the taken branch in the NA code is to have the same polarity as the BT branch outcome). Moving to block 414, the TNT PT packet to be generated is to indicate that the outcome of the NA direct branch instruction is to be of the same polarity (e.g., same direction) as the corresponding BT direct branch instruction that has executed. The method ends at 416.

Figure 5:
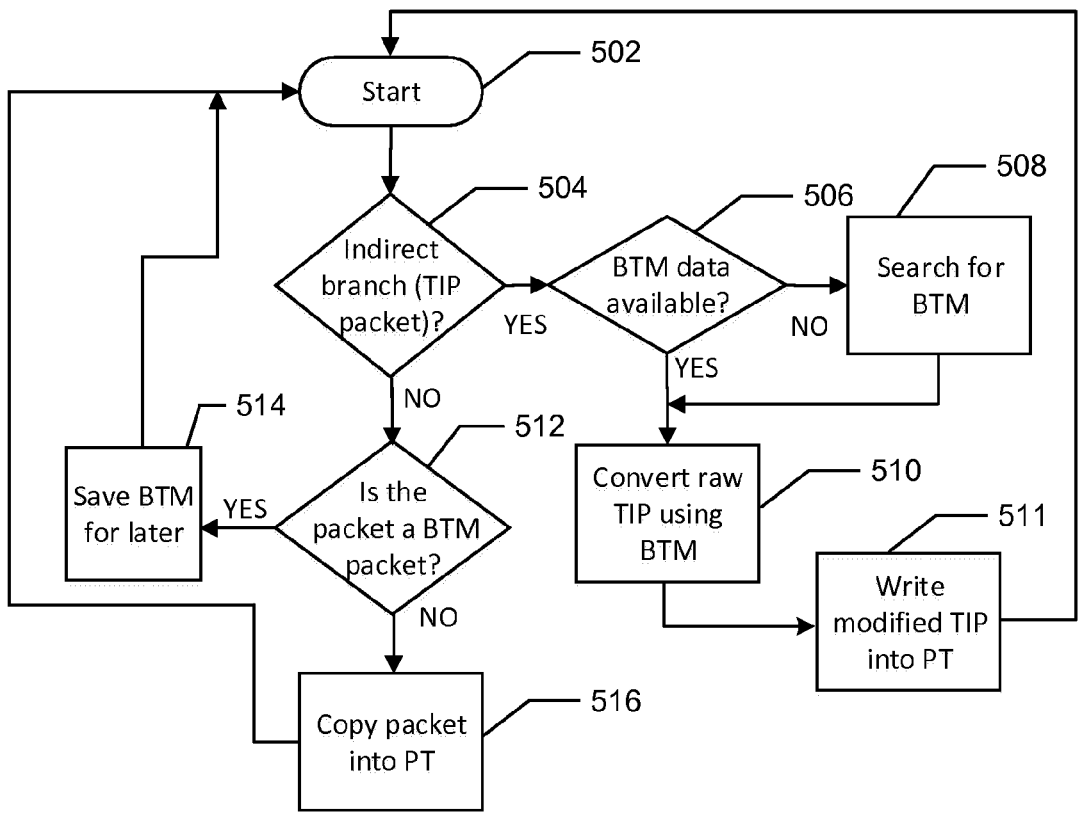
FIG. 5 is a flow diagram of a method, according to embodiments of the present invention.

FIG. 5 is a flow diagram of a method, according to an embodiment of the present invention. Method 500 is directed to post-processing of a raw (e.g., BT) processor trace packet that is based on a result of execution of a BT instruction. Post-processing of the BT processor trace packet produces an NA processor trace packet that indicates a result of execution of an NA instruction that corresponds to the BT instruction.

Method 500 starts at block 502. Continuing to decision diamond 504, a processor trace packet associated with a BT instruction is received by a processor while PT post-execution code (e.g., PT post-execution code 136 of FIG. 1) is in execution. If the processor trace packet is a target instruction pointer (TIP) packet associated with execution of a BT indirect branch instruction (e.g., indirect jump, computed jump, etc.), the method proceeds to decision diamond 506.

At decision diamond 506, the method locates BTM data in order to convert the "raw" TIP packet (e.g., containing a BT instruction pointer that is associated with the outcome of execution of the BT indirect branch instruction) to a modified PT packet that characterizes an outcome of the corresponding NA indirect branch instruction.

At decision diamond 506, if BT metadata (BTM) associated with the TIP packet is available (e.g., the BTM provides mapping information from the binary translated IP that appears the raw PT packet to a native architecture IP that indicates the taken branch in the corresponding NA code), proceeding to block 510 the raw TIP packet is to be converted to the modified TIP packet that indicates the outcome of the indirect branch instruction in NA code. Continuing to block 511, the modified TIP is to be written into the processor trace (PT), and the method returns to 502 to consider the next packet.

If, at decision diamond 506, the corresponding BTM is not available for the TIP under consideration, advancing to block 508 the method looks for the BTM, which may have been generated at another time. When the corresponding BTM is found, continuing to block 510 the raw TIP packet is converted to the modified TIP packet, and advancing to block 511 the modified TIP is written into the processor trace (PT).

If, at decision diamond 504, the packet under consideration is not a TIP packet, the method proceeds to decision diamond 512. At decision diamond 512, if the packet is a BTM packet, continuing to block 514 the BTM packet is to be saved for possible use at a later time. The BTM packet may be saved in, e.g., memory.

If the packet is not a TIP packet and is not a BTM packet, then continuing to block 516 the packet is not in need of conversion (e.g., the packet may a result of execution of a direct branch instruction). The packet is to be copied into the processor trace, and the method returns to 502 to consider another packet. The processor trace (PT) thus produced is a collection of PT packets that represents an execution history in NA code and that can be used to debug and/or tune the NA code.

Figure 6:
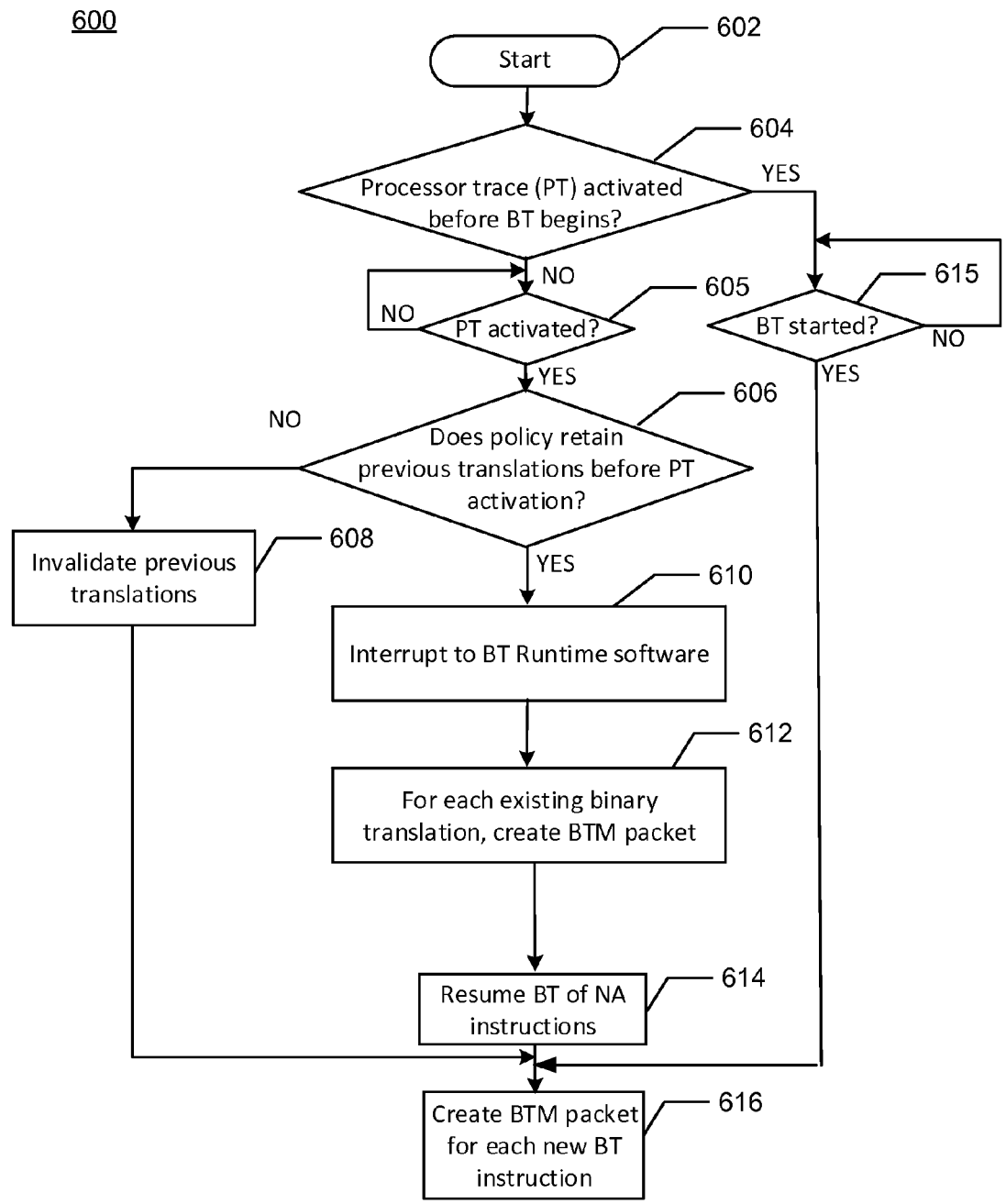
FIG. 6 is a flow diagram of a method, according to an embodiment of the present invention.

FIG. 6 is a flow diagram of a method according to embodiments of the present invention. Method 600 addresses whether a policy is in place to retain previous translations before processor trace is activated, and begins at block 602. Continuing to decision diamond 604, if a processor trace function (e.g., executed by hardware within a processor or software executed by the processor to create PT packets) was activated before binary translation (BT) begins, the method advances to decision diamond 615. At decision diamond 615, the method waits until binary translation (BT) is started (e.g., stalls at 615 until BT is initiated). When BT is initiated, moving to block 616 a BTM packet is to be created (e.g., via execution of BT runtime software) for each binary translation. That is, binary translation metadata (e.g., a BTM packet) that includes a mapping of a BT address to an NA address is to be created for each BT translation of a corresponding NA instruction. The BTM packet is to provide an address mapping that enables a PT packet associated with an executed BT instruction to be modified to include address information (e.g., branch taken information) of the NA instruction from which the BT instruction was translated.

If, at decision diamond 604, the PT function has not been activated before BT has begun, advancing to decision diamond 605 the method is delayed until the PT function is activated. After the PT function is activated, moving to decision diamond 606, if there is a policy in place that does not retain previous translations (e.g., invalidates previous binary translations) before PT activation, moving to block 608 previous binary translations are invalidated. Proceeding to block 616, a BTM packet is to be created for each new BT instruction.

If, at decision diamond 606, the policy in place retains previous binary translations prior to PT activation, continuing to block 610 the binary translation is interrupted to execute BT runtime software (e.g. trapped to the BT runtime software) in order to create BTM packets. Continuing to block 612, for each existing binary translation (e.g., BT instruction), the BT runtime software creates a BTM packet. Advancing to block 614, when each BT instruction has a corresponding BTM packet the method resumes binary translation of NA instructions that have not yet been translated, and moving to block 616, a BTM packet is to be created for each new binary translation of a corresponding NA instruction. Thus, according to the method 600, each BT instruction has a corresponding BTM packet that may be useful in analysis of the NA code.

Figure 7:
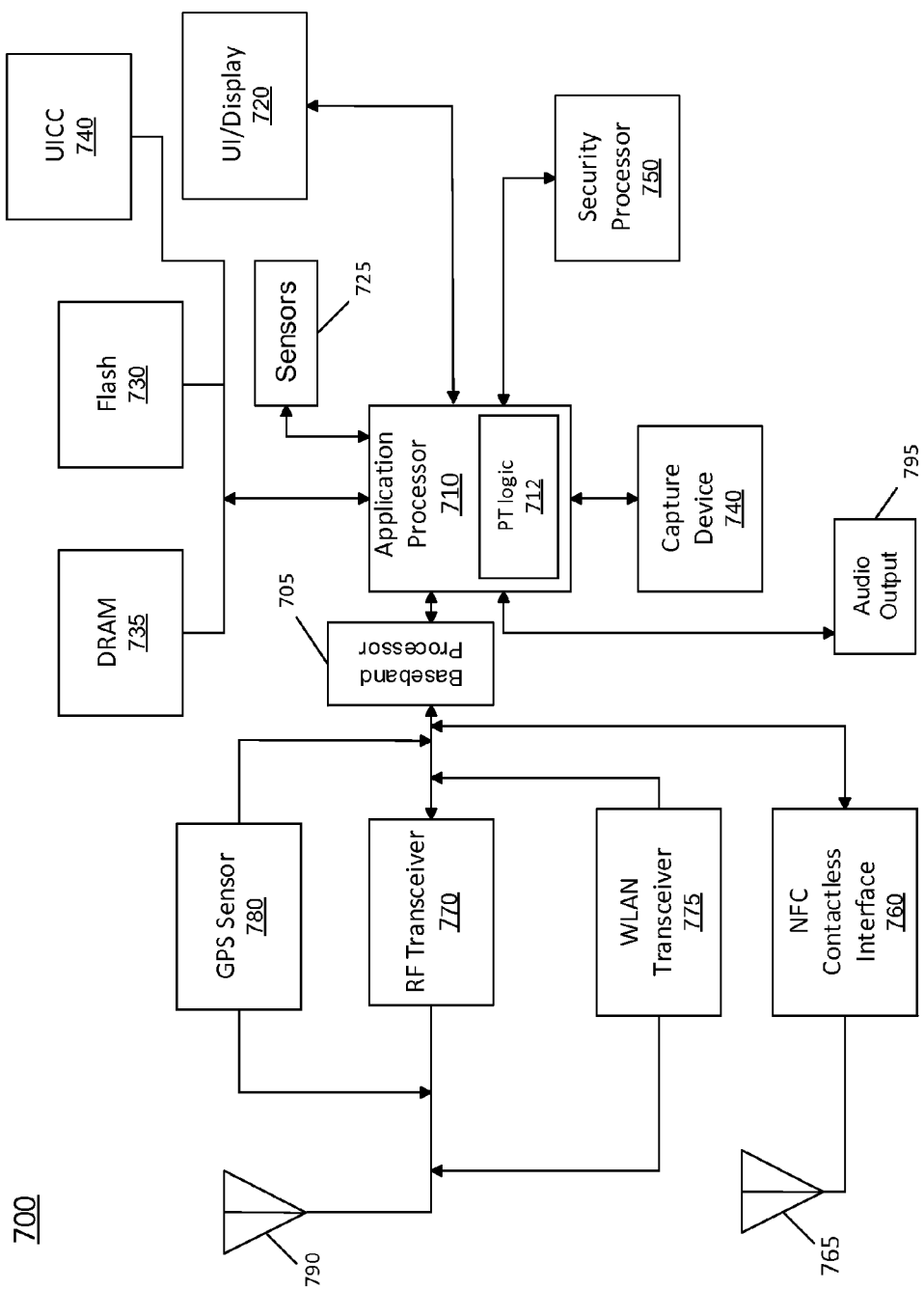
FIG. 7 is a block diagram of an example system with which embodiments can be used.

Referring now to FIG. 7, shown is a block diagram of an example system with which embodiments can be used. As seen, system 700 may be a smartphone or other wireless communicator. A baseband processor 705 is configured to perform various signal processing with regard to communication signals to be transmitted from or received by the system. In turn, baseband processor 705 is coupled to an application processor 710, which may be a main CPU of the system to execute an OS and other system software, in addition to user applications such as many well-known social media and multimedia applications. Application processor 710 may further be configured to perform a variety of other computing operations for the device. The application processor 710 can include processor trace logic 712 to modify PT packets that have been generated, according to embodiments of the present invention. Modification of the PT packets may reflect outcomes of native architecture instructions of native architecture code, based on the outcomes of corresponding binary translated instructions, and can be useful to debug and/or "tune" (, e.g., in order to increase execution efficiency) native architecture (NA) code.

In turn, application processor 710 can couple to a user interface/display 720, e.g., a touch screen display. In addition, application processor 710 may couple to a memory system including a non-volatile memory, namely a flash memory 730 and a system memory, namely a dynamic random access memory (DRAM) 735. As further seen, application processor 710 further couples to a capture device 740 such as one or more image capture devices that can record video and/or still images.

Still referring to FIG. 7, a universal integrated circuit card (UICC) 740 comprising a subscriber identity module and possibly a secure storage and cryptoprocessor is also coupled to application processor 710. System 700 may further include a security processor 750 that may couple to application processor 710. A plurality of sensors 725 may couple to application processor 710 to enable input of a variety of sensed information such as accelerometer and other environmental information. An audio output device 795 may provide an interface to output sound, e.g., in the form of voice communications, played or streaming audio data and so forth.

As further illustrated, a near field communication (NFC) contactless interface 760 is provided that communicates in a NFC near field via an NFC antenna 765. While separate antennae are shown in FIG. 7, understand that in some implementations one antenna or a different set of antennae may be provided to enable various wireless functionality.

To enable communications to be transmitted and received, various circuitry may be coupled between baseband processor 705 and an antenna 790. Specifically, a radio frequency (RF) transceiver 770 and a wireless local area network (WLAN) transceiver 775 may be present. In general, RF transceiver 770 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 780 may be present. Other wireless communications such as receipt or transmission of radio signals, e.g., AM/FM and other signals may also be provided. In addition, via WLAN transceiver 775, local wireless communications can also be realized.

Figure 8:
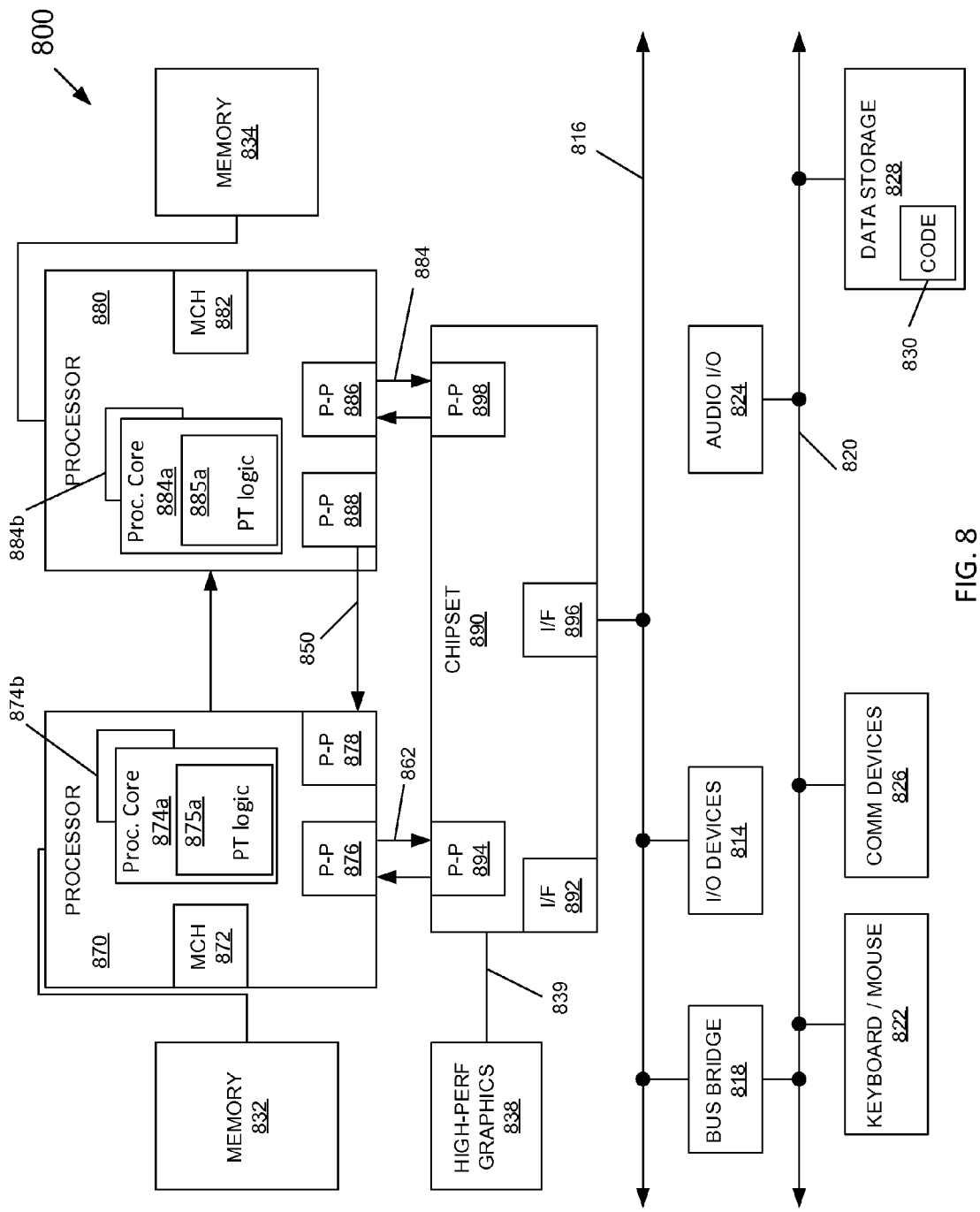
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. Processor cores 874a and 884a may execute binary translated (BT) code that has been translated from native architecture (NA) code written in a native architecture instruction set. In embodiments of the present invention, core 874a is to include processor trace (PT) logic 875a, and core 884a is to include PT logic 885a. In embodiments of the present invention, PT logic 884a and 885a are to modify PT packets generated responsive to execution of the BT code to reflect execution outcomes of NA instructions that correspond to BT instructions of the BT code. Modified PT packets may provide information (e.g., outcome of branch instructions) can serve as a tool to aid in analysis (e.g., debugging) of a program written in NA code and executed in BT code, in accordance with embodiments of the present invention.

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCHs 872 and 882 couple the processors to respective memories, namely a memory 832 and a memory 834, which may be portions of main memory (e.g., DRAM) locally attached to the respective processors. First processor 870 and second processor 880 may be coupled to a chipset 890 via P-P interconnects 862 and 884, respectively. As shown in FIG. 8, chipset 890 includes P-P interfaces 894 and 898.

Furthermore, chipset 890 includes an interface 892 to couple chipset 890 with a high performance graphics engine 838 via a P-P interconnect 839. In turn, chipset 890 may be coupled to a first bus 816 via an interface 896. As shown in FIG. 8, various input/output (I/O) devices 814 may be coupled to first bus 816, along with a bus bridge 818, which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio input/output (I/O) 824 may be coupled to second bus 820. Embodiments can be incorporated into other types of systems including mobile devices such as a smart cellular telephone, tablet computer, netbook, Ultrabook™, or so forth.

Additional embodiments are described below.

In a first example, a processor includes execution logic to execute binary translated (BT) code that is translated from native architecture (NA) code, and processor trace (PT) logic to output trace information responsive to execution of a BT direct branch instruction in the BT code when the NA code includes an NA direct branch instruction that corresponds to the BT direct branch instruction. The trace information is to include an indication of an NA outcome associated with an execution of the NA direct branch instruction, The trace information is to be based on a BT outcome associated with the execution of the BT direct branch instruction.

A $2^{nd}$ example includes elements of the $1^{st}$ example, where the indication of the NA outcome includes an indication of a branch address associated with an outcome of the execution of the NA direct branch instruction.

A $3^{rd}$ example includes elements of the $1^{st}$ example, where responsive to receipt of an asynchronous interrupt, the PT logic is to generate a flow update packet that is to include an indication of an NA instruction pointer associated with an NA instruction that corresponds to a BT instruction to be executed within an execution queue.

A 4$^{th}$ example includes elements of the 3$^{rd}$ example. Additionally, the processor is to switch from execution of the BT code to execution of a portion of the NA code beginning with the NA instruction responsive to receipt of the asynchronous interrupt.

A 5$^{th}$ example includes elements of the 4$^{th}$ example, where the processor is to delay handling of the asynchronous interrupt until the processor has switched from the execution of the BT code to the execution of the portion of the NA code.

A 6$^{th}$ example includes elements of the 1$^{st}$ example. When the NA code lacks the NA direct branch instruction that corresponds to the BT direct branch instruction, the PT logic is to refrain from outputting the trace information.

A 7$^{th}$ example includes elements of the 1$^{st}$ example, where the trace information is based on a translation type indicator associated with the BT direct branch instruction. The translation type indicator is to indicate that the NA outcome associated with execution of the NA direct branch instruction is one of a same polarity outcome and an opposite polarity outcome relative to the BT outcome of the execution of the BT direct branch instruction.

An 8$^{th}$ example includes elements of any one of examples 1 to 7, where when the BT code includes a BT indirect branch instruction that corresponds to an NA indirect branch instruction in the NA code, the PT logic is to output the trace information that is to indicate a BT target address associated with execution of the BT indirect branch instruction and the processor is to output binary translation metadata (BTM) that maps the BT target address to an NA target address associated with execution of the NA indirect branch instruction.

A 9$^{th}$ example is a system that includes a processor including at least one execution means for executing instructions. The processor is to execute binary translated (BT) code that has been translated from native architecture (NA) code. Responsive to receipt of an asynchronous interrupt, the processor is to output flow update information that is to include a representation of an NA instruction pointer associated with an NA instruction of the NA code, where the NA instruction corresponds to a BT instruction to be executed in the BT code when the asynchronous interrupt is received. The system also includes a memory to store the NA code.

A 10$^{th}$ example includes elements of the 9$^{th}$ example, where the processor is to switch from execution of the BT code to execution of a portion of the NA code beginning with the NA instruction responsive to receipt of the asynchronous interrupt.

An 11$^{th}$ example includes elements of the 10$^{th}$ example, where the processor is to delay handling of the asynchronous interrupt until the processor has switched from the execution of the BT code to the execution of the portion of the NA code.

A 12$^{th}$ example includes elements of the 9$^{th}$ example, where when the BT code includes a first BT direct branch instruction that corresponds to a first NA direct branch instruction of the NA code, responsive to execution of the first BT direct branch instruction the processor is to output processor trace (PT) information to include an indication of an outcome of execution of the first NA direct branch instruction. The outcome of execution of the first NA direct branch instruction is to be determined based on an outcome of execution of the first BT direct branch instruction.

A 13$^{th}$ example includes elements of the 12$^{th}$ example, where the indication of the outcome of execution of the first NA branch instruction is to be determined by the processor based on a translation type indicator associated with the first BT direct branch instruction. The translation type indicator is to indicate that the outcome of execution of the first NA branch instruction is one of a same polarity outcome and an opposite polarity outcome relative to the outcome of execution of the first BT branch instruction.

A 14$^{th}$ example includes elements of the 9$^{th}$ example where when the BT code includes a second BT direct branch instruction that has no corresponding NA direct branch instruction in the NA code, responsive to execution of the second BT direct branch instruction the processor is to refrain from output of corresponding processor trace information.

A 15$^{th}$ example includes elements of the 9$^{th}$ example, where when the BT code includes a BT indirect branch instruction that corresponds to an NA indirect branch instruction in the NA code, the processor is to output a processor trace (PT) packet that is to include an identifier of a BT destination address that results from execution of the BT indirect branch instruction, and the processor is to output a binary translation metadata (BTM) packet that is to map the BT destination address to an NA destination address associated with execution of the NA indirect branch instruction.

A 16$^{th}$ example includes elements of the 15$^{th}$ example, where the processor is to modify the PT packet, based on the BTM packet, to include an identifier of the NA destination address.

A 17$^{th}$ example is a machine-readable medium having stored thereon data, which if used by at least one machine, cause the at least one machine to fabricate at least one integrated circuit to perform a method that includes executing by a processor binary translated (BT) code translated from native architecture (NA) code, and responsive to execution of a BT branch instruction of the BT code, when the BT branch instruction has a corresponding NA branch instruction in the NA code, outputting by the processor trace information associated with an outcome of execution of the corresponding NA branch instruction.

An 18$^{th}$ example includes elements of the 17$^{th}$ example. The method further includes when the BT branch instruction is a direct branch instruction for which the NA code includes an NA direct branch instruction that corresponds to the BT branch instruction, including in the processor trace information an indication of an outcome of execution of the NA direct branch instruction, the indication determined based at least in part on an outcome of execution of the BT branch instruction.

A 19$^{th}$ example includes elements of the 18$^{th}$ example. The method also includes determining an indication of the outcome of execution of the NA direct branch instruction further based on a translation type indicator associated with the BT branch instruction. The translation type indicator is to indicate the outcome of execution of the NA direct branch instruction relative to the outcome of execution of the BT branch instruction. The translation type indicator is to indicate one of a same polarity outcome and an opposite polarity outcome.

A 20$^{th}$ example includes elements of the 17$^{th}$ example. The method also includes when the BT branch instruction is an indirect branch instruction that corresponds to an NA indirect branch instruction in the NA code, executing by the processor the BT branch instruction, outputting by the processor BT trace information to include a representation of a BT target address associated with execution of the BT branch instruction, and outputting by the processor binary translation metadata (BTM) that maps the BT target address to an NA target address associated with execution of the NA indirect branch instruction.

A 21$^{st}$ example includes elements of the 20$^{th}$ example. The method further includes based on the BT trace information and the BTM, outputting by the processor a processor trace packet that includes NA trace information and that includes an indication of the NA target address.

A 22$^{nd}$ example includes elements of the 17$^{th}$ example. The method further includes responsive to an asynchronous interrupt, outputting flow update information that is to include a representation of an NA instruction pointer associated with an NA instruction of the NA code. The NA instruction corresponds to a BT instruction to be executed in the BT code when the asynchronous interrupt is received.

A 23$^{rd}$ example includes elements of the 22$^{nd}$ example. The method further includes switching from execution of the BT code to execution of a portion of the NA code beginning with the NA instruction responsive to receipt of the asynchronous interrupt.

A 24$^{th}$ example includes elements of the 23$^{rd}$ example. The method further includes delaying handling of the asynchronous interrupt until the processor has switched from the execution of the BT code to the execution of the portion of the NA code.

A 25$^{th}$ example is a method that includes executing, by a processor, binary translated (BT) code translated from native architecture (NA) code, and responsive to execution of a BT branch instruction of the BT code, when the BT branch instruction has a corresponding NA branch instruction in the NA code, outputting by the processor, trace information associated with an outcome of execution of the corresponding NA branch instruction.

A 26$^{th}$ example includes elements of the 25$^{th}$ example, and further includes when the BT branch instruction is a direct branch instruction for which the NA code includes an NA direct branch instruction that corresponds to the BT branch instruction, including in the processor trace information an indication of the outcome of execution of the NA direct branch instruction. The indication is to be determined based at least in part on an outcome of execution of the BT branch instruction.

A 27$^{th}$ example includes elements of the 26$^{th}$ example, where the method further includes determining the indication of the NA direct branch instruction outcome further based on a translation type indicator associated with the BT branch instruction, the translation type indicator to indicate the outcome of execution of the NA direct branch instruction relative to the outcome of execution of the BT branch instruction, and where the translation type indicator is to indicate one of a same polarity outcome and an opposite polarity outcome.

A 28$^{th}$ example includes elements of the 25$^{th}$ example. The method further includes when the BT branch instruction is an indirect branch instruction that corresponds to an NA indirect branch instruction in the NA code, executing by the processor the BT branch instruction, outputting by the processor BT trace information to include a representation of a BT target address associated with execution of the BT branch instruction, and outputting by the processor binary translation metadata (BTM) that is to map the BT target address to an NA target address associated with execution of the NA indirect branch instruction.

A 29$^{th}$ example includes elements of the 28$^{th}$ example. The method further includes based on the BT trace information and the BTM, outputting by the processor a processor trace packet that includes NA trace information associated with the execution of the NA indirect branch instruction and that includes an indication of the NA target address.

A 30$^{th}$ example includes elements of any one of examples 25 to 29. The method further includes responsive to an asynchronous interrupt, outputting flow update information that is to include a representation of an NA instruction pointer associated with an NA instruction of the NA code. The NA instruction corresponds to a BT instruction to be executed in the BT code when the asynchronous interrupt is received.

A 31$^{st}$ example includes elements of the 30$^{th}$ example, wherein the method further comprises switching from execution of the BT code to execution of a portion of the NA code beginning with the NA instruction responsive to receipt of the asynchronous interrupt.

A 32$^{nd}$ example includes elements of the 31$^{st}$ example, and also includes delaying handling of the asynchronous interrupt until the processor has switched from the execution of the BT code to the execution of the portion of the NA code.

A 33$^{rd}$ example is an apparatus that includes means for executing the method of any one of examples 25 to 29.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   execution logic to execute binary translated (BT) code that is translated from native architecture (NA) code; and
   processor trace (PT) logic to output trace information responsive to execution of a BT direct branch instruction in the BT code when the NA code includes an NA direct branch instruction that corresponds to the BT direct branch instruction, wherein the trace information is to include an indication of an NA outcome associated with an execution of the NA direct branch instruction, wherein the trace information is to be based on a BT outcome associated with the execution of the BT direct branch instruction.

2. The processor of claim 1, wherein the indication of the NA outcome is to include an indication of a branch address associated with an outcome of the execution of the NA direct branch instruction.

3. The processor of claim 1, wherein responsive to receipt of an asynchronous interrupt, the PT logic is to generate a flow update packet that is to include an indication of an NA instruction pointer associated with an NA instruction that corresponds to a BT instruction to be executed within an execution queue.

4. The processor of claim 1, wherein when the NA code lacks the NA direct branch instruction that corresponds to the BT direct branch instruction, the PT logic is to refrain from output of the trace information.

5. The processor of claim 1, wherein the trace information is to be based on a translation type indicator associated with the BT direct branch instruction, the translation type indicator to indicate that the NA outcome associated with the execution of the NA direct branch instruction is one of a same polarity outcome and an opposite polarity outcome relative to the BT outcome associated with the execution of the BT direct branch instruction.

6. The processor of claim 1, wherein when the BT code includes a BT indirect branch instruction that corresponds to an NA indirect branch instruction in the NA code, the PT logic is to output the trace information that is to indicate a BT target address associated with execution of the BT indirect branch instruction and the processor is to output binary translation metadata (BTM) that maps the BT target address to an NA target address associated with execution of the NA indirect branch instruction.

7. A system comprising:
a processor including at least one core, the processor to:
execute binary translated (BT) code that has been translated from native architecture (NA) code; and
responsive to receipt of an asynchronous interrupt, output flow update information that is to include a representation of an NA instruction pointer associated with an NA instruction of the NA code, wherein the NA instruction corresponds to a BT instruction to be executed in the BT code when the asynchronous interrupt is received; and
a memory to store the NA code.

8. The system of claim 7, wherein the processor is to switch from execution of the BT code to execution of a portion of the NA code beginning with the NA instruction responsive to receipt of the asynchronous interrupt.

9. The system of claim 8, wherein the processor is to delay handling of the asynchronous interrupt until the processor has switched from the execution of the BT code to the execution of the portion of the NA code.

10. The system of claim 7, wherein when the BT code includes a first BT direct branch instruction that corresponds to a first NA direct branch instruction of the NA code, responsive to execution of the first BT direct branch instruction the processor is to output processor trace (PT) information to include an indication of an outcome of execution of the first NA direct branch instruction, wherein the outcome of execution of the first NA direct branch instruction is to be determined based on an outcome of execution of the first BT direct branch instruction.

11. The system of claim 10, wherein the indication of the outcome of execution of the first NA branch instruction is to be determined by the processor based on a translation type indicator associated with the first BT direct branch instruction, wherein the translation type indicator is to indicate that the outcome of execution of the first NA branch instruction is one of a same polarity outcome and an opposite polarity outcome relative to the outcome of execution of the first BT branch instruction.

12. The system of claim 10, wherein when the BT code includes a second BT direct branch instruction that has no corresponding NA direct branch instruction in the NA code, responsive to execution of the second BT direct branch instruction the processor is to refrain from output of corresponding processor trace information.

13. The system of claim 7, wherein when the BT code includes a BT indirect branch instruction that corresponds to an NA indirect branch instruction in the NA code, the processor is to output a processor trace (PT) packet that is to include an identifier of a BT destination address that results from execution of the BT indirect branch instruction, and the processor is to output a binary translation metadata (BTM) packet that is to map the BT destination address to an NA destination address, wherein the NA destination address is associated with execution of the NA indirect branch instruction.

14. The system of claim 13, wherein the processor is to modify the PT packet, based on the BTM packet, to include an identifier of the NA destination address.

15. A non-transitory machine-readable medium having stored thereon data, which if used by at least one machine, cause the at least one machine to fabricate at least one integrated circuit to perform a method comprising:
executing by a processor binary translated (BT) code translated from native architecture (NA) code; and
responsive to execution of a BT branch instruction of the BT code, when the BT branch instruction has a corresponding NA branch instruction in the NA code, outputting by the processor, trace information associated with an outcome of execution of the corresponding NA branch instruction.

16. The non-transitory machine-readable medium of claim 15, wherein the method further includes when the BT branch instruction is a direct branch instruction for which the NA code includes an NA direct branch instruction that corresponds to the BT branch instruction, including in the trace information an indication of an outcome of execution of the NA direct branch instruction, the indication determined based at least in part on an outcome of execution of the BT branch instruction.

17. The non-transitory machine-readable medium of claim 16, wherein the method further comprises determining the indication of the outcome of execution of the NA direct branch instruction further based on a translation type indicator associated with the BT branch instruction, the translation type indicator to indicate the outcome of execution of the NA direct branch instruction relative to the outcome of execution of the BT branch instruction, wherein the translation type indicator is to indicate one of a same polarity outcome and an opposite polarity outcome.

18. The non-transitory machine-readable medium of claim 15, wherein the method further includes when the BT branch instruction is an indirect branch instruction that corresponds to an NA indirect branch instruction in the NA code, executing by the processor the BT branch instruction, outputting by the processor BT trace information to include a representation of a BT target address associated with execution of the BT branch instruction, and outputting by the processor binary translation metadata (BTM) that maps the BT target address to an NA target address associated with execution of the NA indirect branch instruction.

19. The non-transitory machine-readable medium of claim 18, wherein the method further includes based on the BT trace information and the BTM, outputting by the processor a processor trace packet that includes NA trace information that includes an indication of the NA target address.

20. The non-transitory machine-readable medium of claim 15, wherein the method further includes responsive to an asynchronous interrupt, outputting flow update information that is to include a representation of an NA instruction pointer associated with an NA instruction of the NA code, wherein the NA instruction corresponds to a BT instruction to be executed in the BT code when the asynchronous interrupt is received.

* * * * *